USO05484253A

United States Patent [19]
Johnson

[11] Patent Number: 5,484,253
[45] Date of Patent: Jan. 16, 1996

[54] CONFORMED FRAME APPARATUS FOR HANDLING LOADS INVOLVED IN ARBOR RIGGING PROCEDURES

[76] Inventor: Kent H. Johnson, 521 Hawthorne Ave., Los Altos, Calif. 94024

[21] Appl. No.: 335,033

[22] Filed: Nov. 7, 1994

[51] Int. Cl.⁶ .................................................. A01G 17/00
[52] U.S. Cl. .................... 414/787; 144/22; 144/343; 254/380; 254/382
[58] Field of Search .................... 414/23; 254/221, 254/223, 224, 360, 376, 380, 382; 144/336, 338, 343, 34 R, 27; 248/218.4, 219.4, 231; 182/133, 136

[56] References Cited

U.S. PATENT DOCUMENTS

| | | | |
|---|---|---|---|
| 482,163 | 9/1892 | Cole | 248/231 |
| 758,200 | 4/1904 | Bennett | 182/133 |
| 3,548,899 | 12/1970 | Emerson | 144/336 |
| 3,991,799 | 11/1976 | Albright | 144/34 R |
| 4,239,188 | 12/1980 | Hobbs | 254/376 |
| 4,314,693 | 2/1982 | Hobbs | 254/376 |
| 5,098,054 | 3/1992 | Dyer | 248/231 |
| 5,301,911 | 4/1994 | Beauchemin | 248/218.4 |
| 5,310,151 | 5/1994 | Engel | 248/219.4 |

*Primary Examiner*—Michael S. Huppert
*Assistant Examiner*—Douglas A. Hess
*Attorney, Agent, or Firm*—Feix & Feix

[57] ABSTRACT

A frame apparatus is constructed to be mounted on and conformed to the trunk of a tree for use by arborists in handling loads involved in an arbor rigging procedure. The frame apparatus engages a curved surface of the trunk of the tree at three triangularly disposed locations. In one embodiment an angled spike structure at one lower end of the frame structure penetrates the trunk at an angle which utilizes circumferential shifting and inward pulling of the frame apparatus on the tree to secure the frame apparatus to the tree. In another embodiment resilient pads are mounted at each of the three triangularly disposed locations for resiliently gripping the opposed portion of the trunk to minimize damage to the tree.

18 Claims, 7 Drawing Sheets

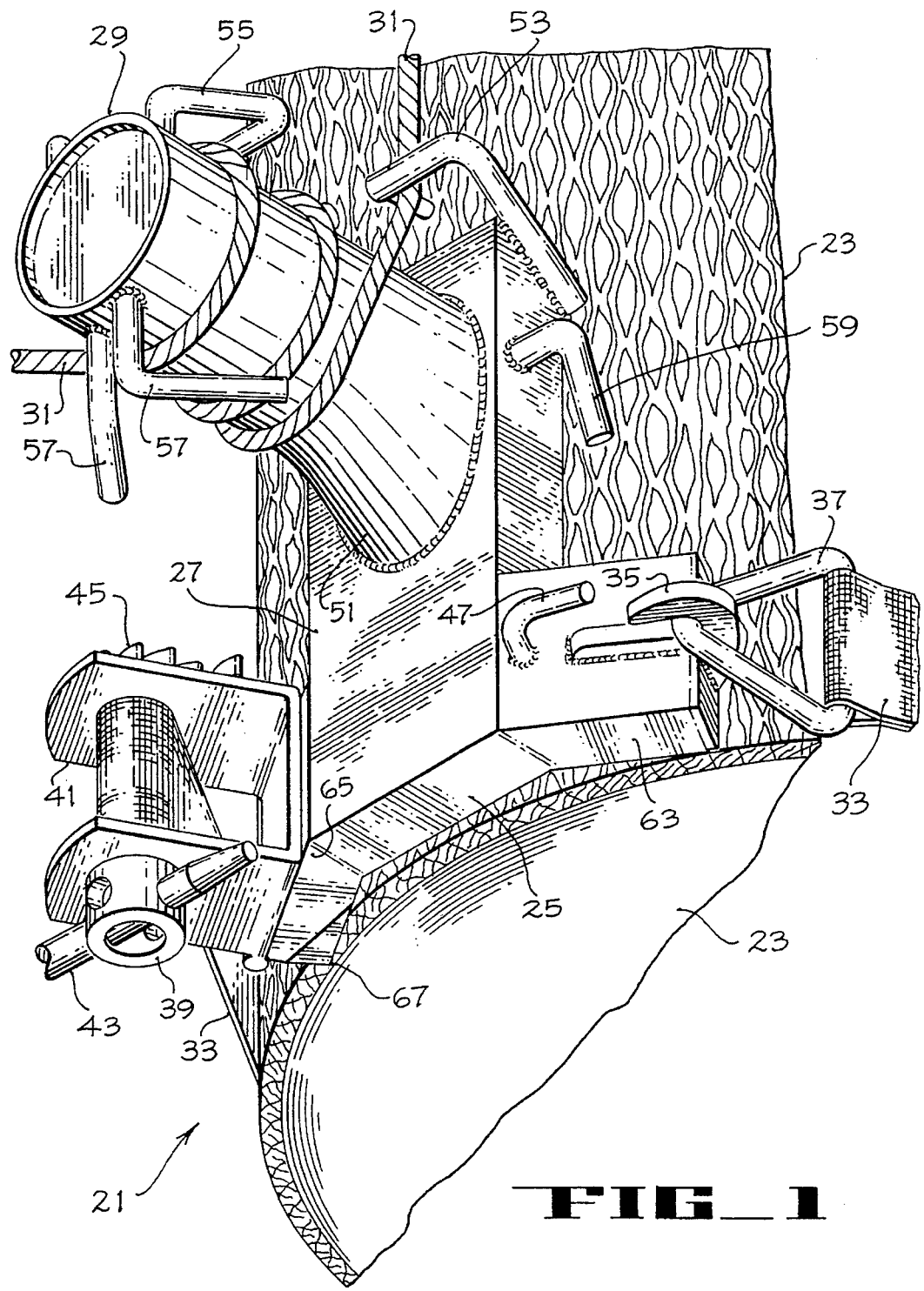
FIG_1

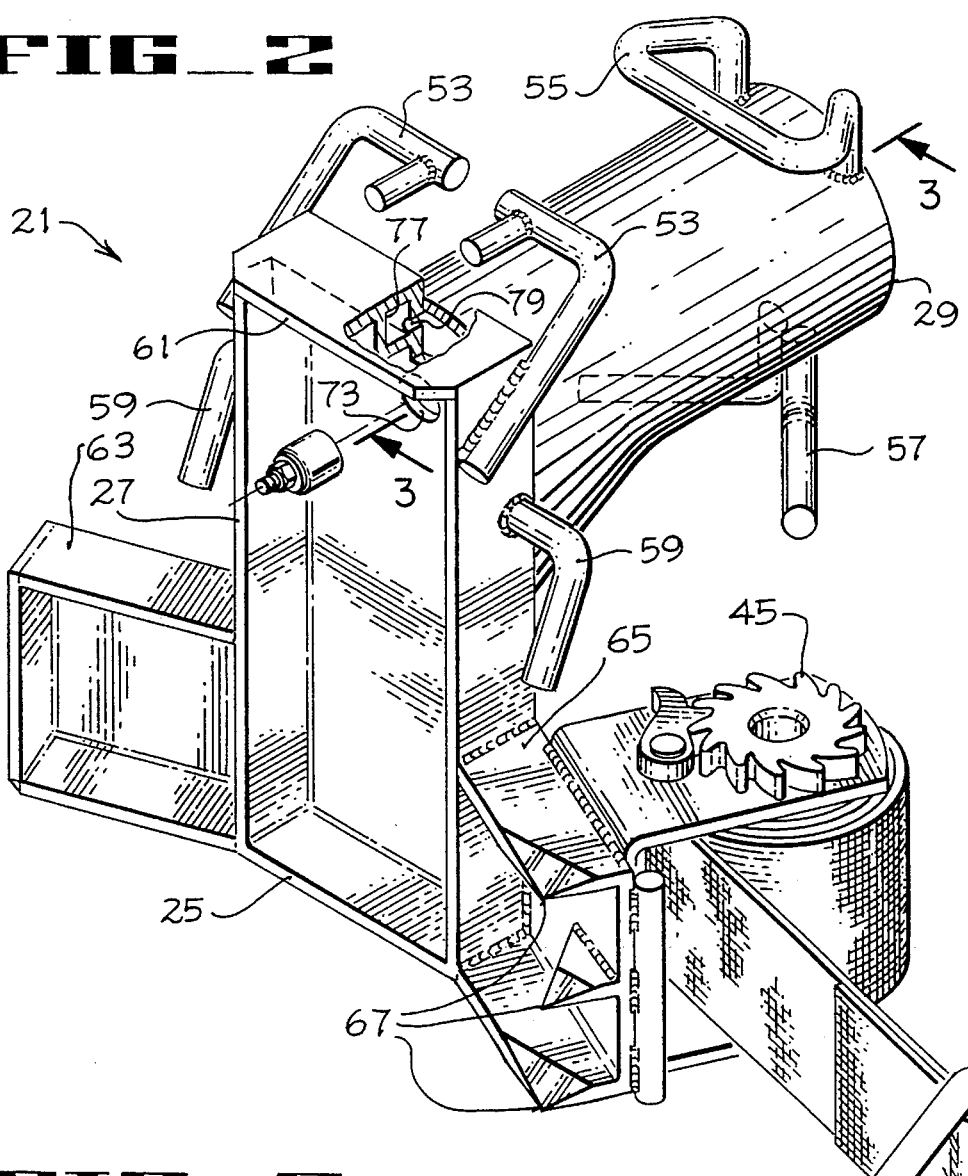
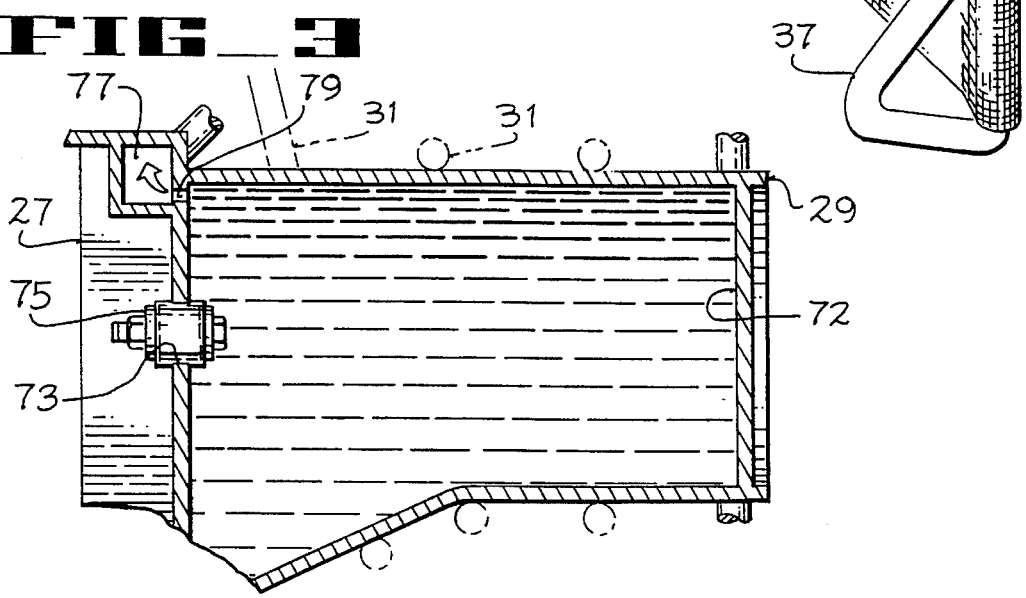

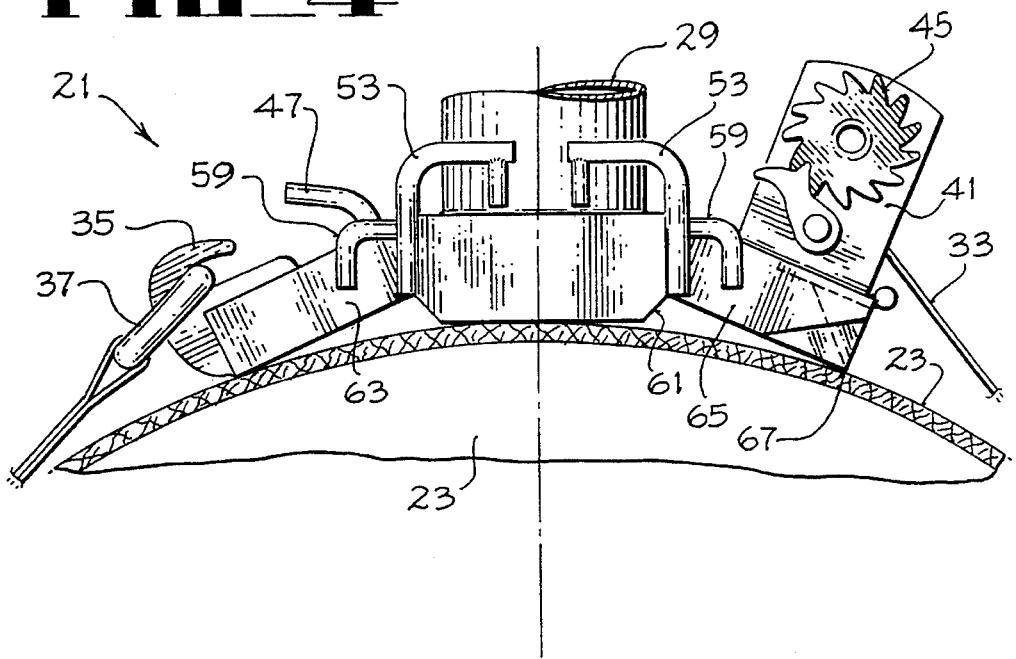
FIG_4
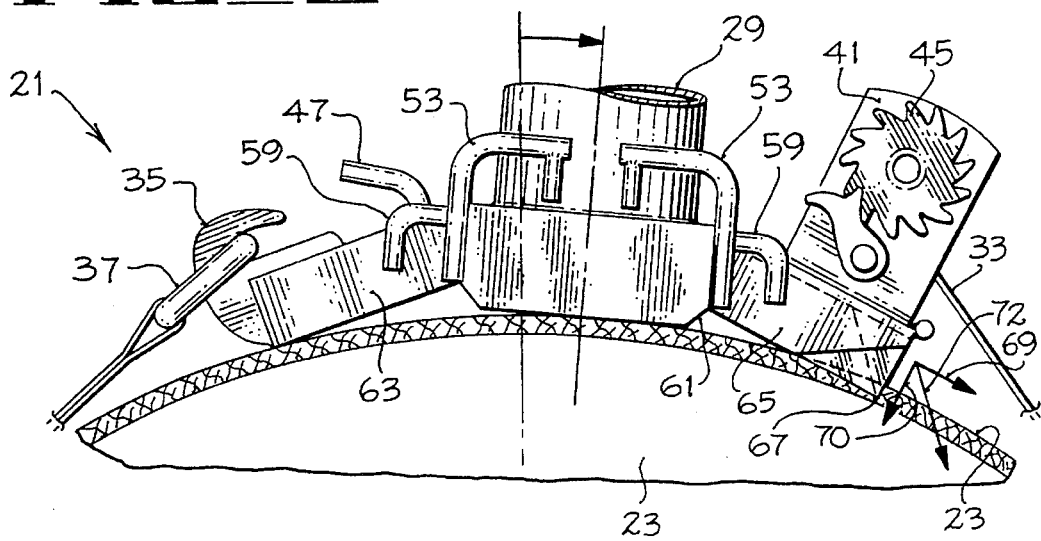
FIG_5

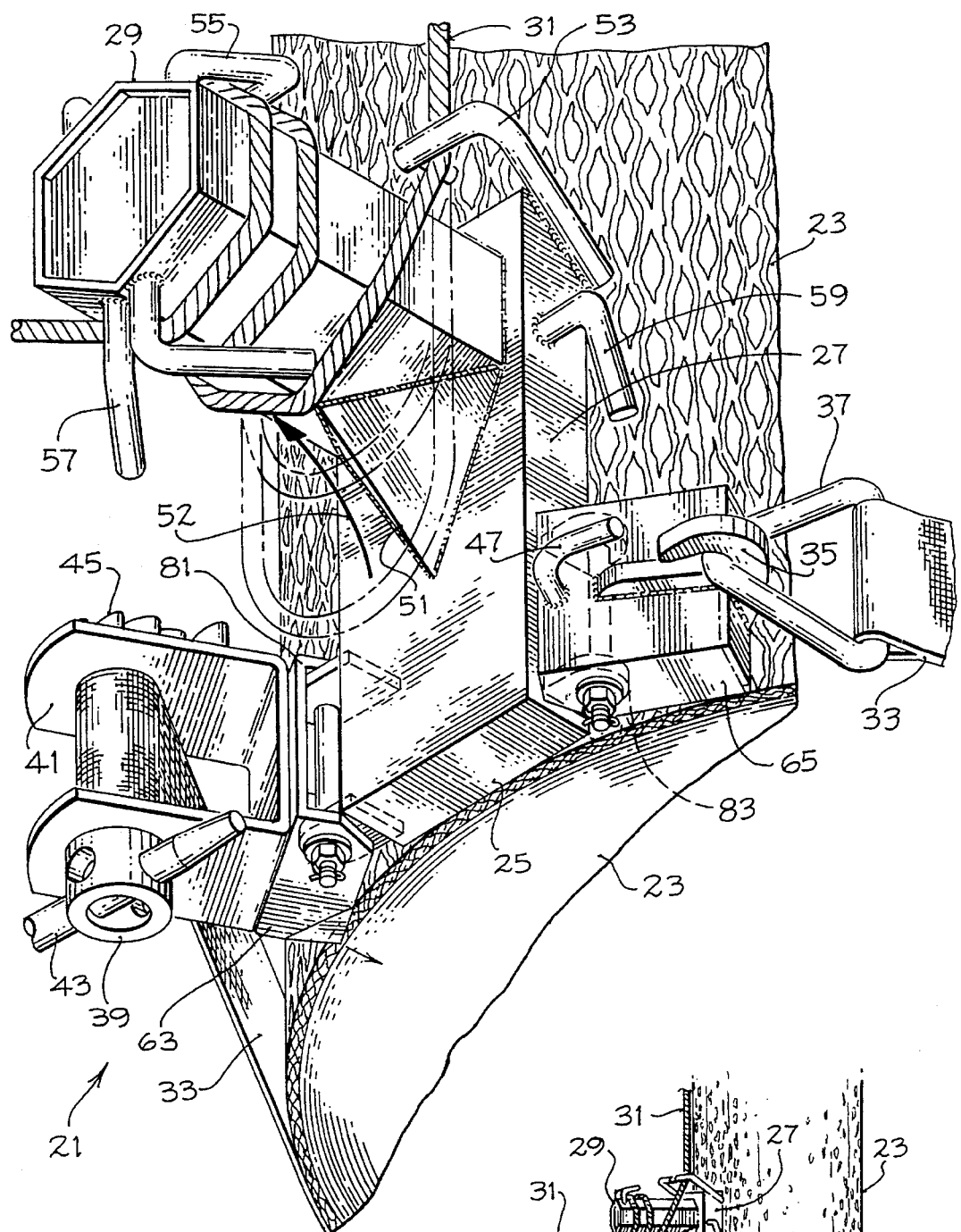
FIG_6
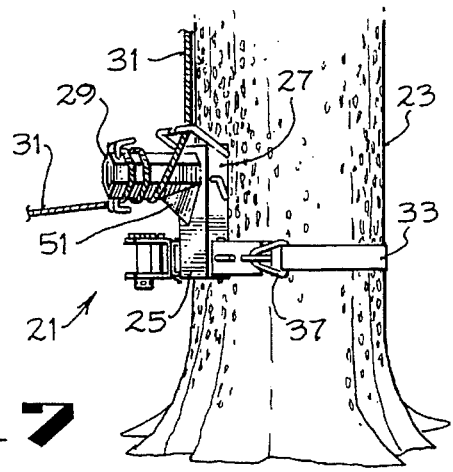
FIG_7

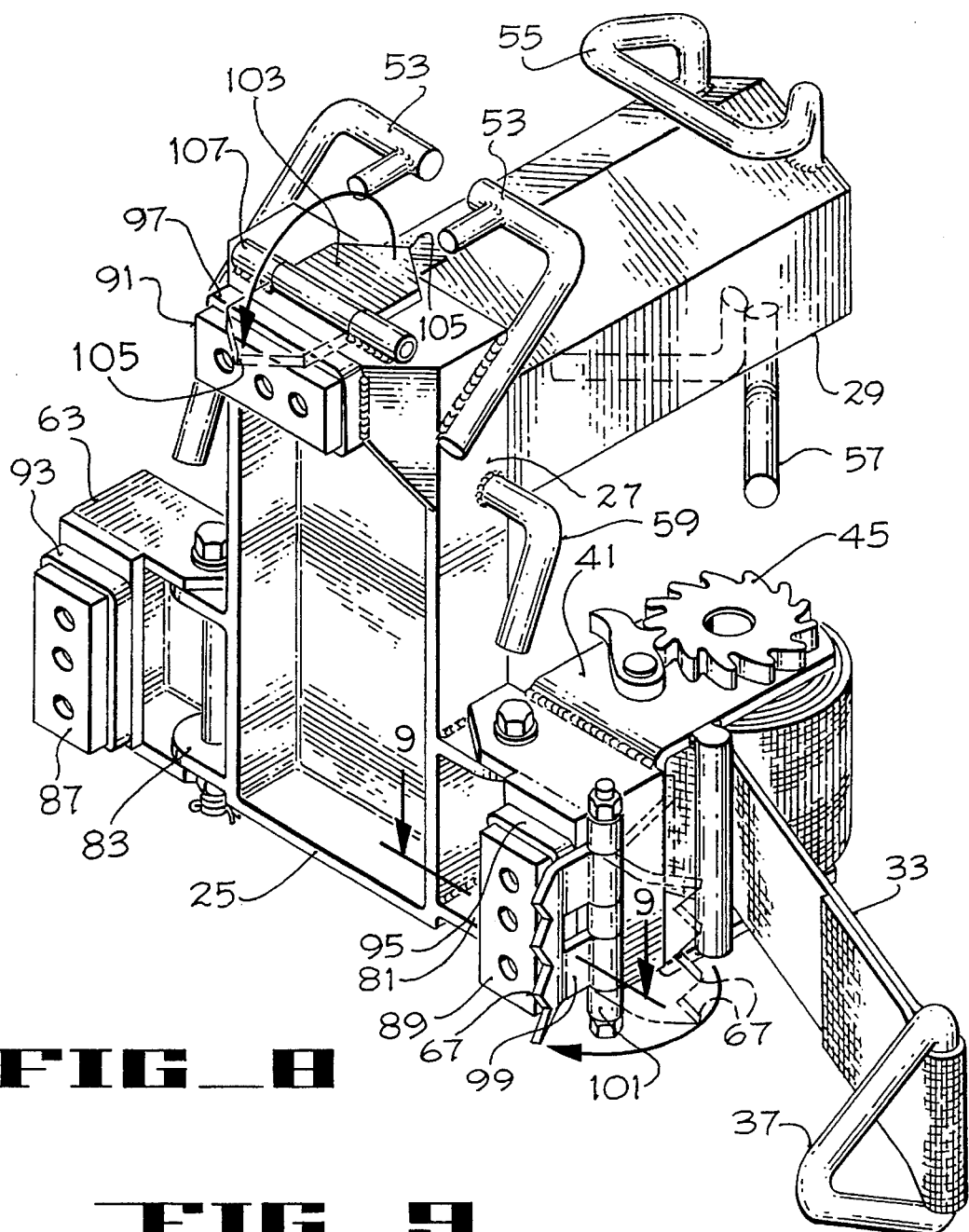
FIG_8
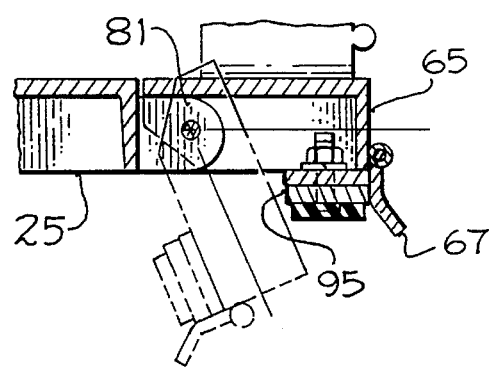
FIG_9

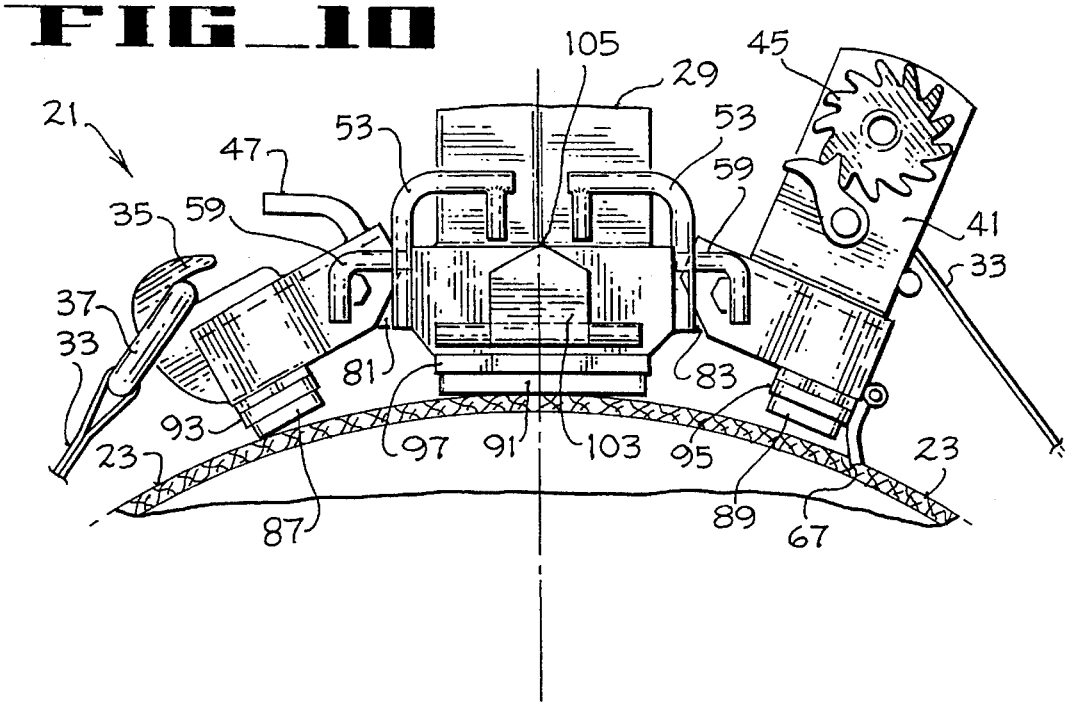
FIG_10
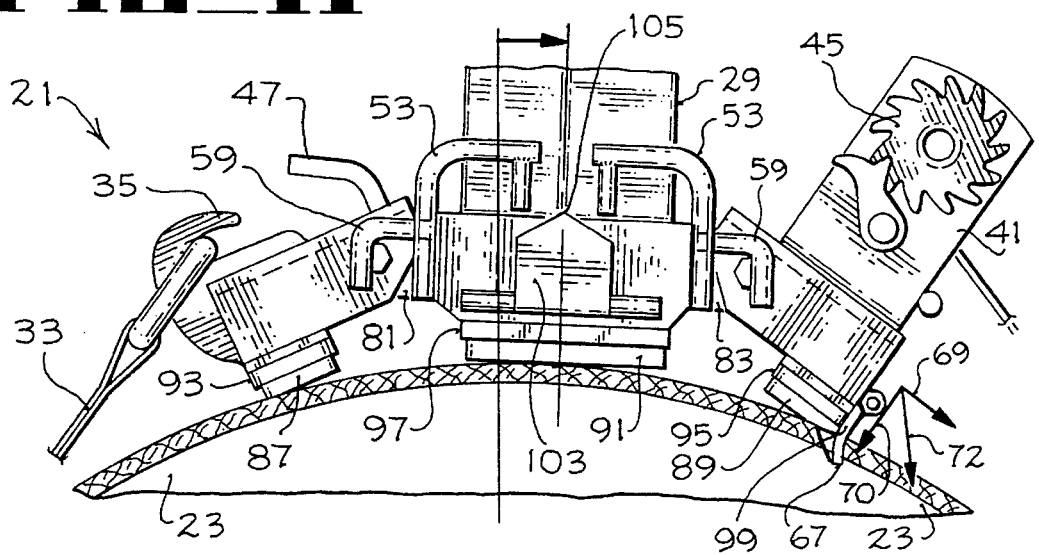
FIG_11

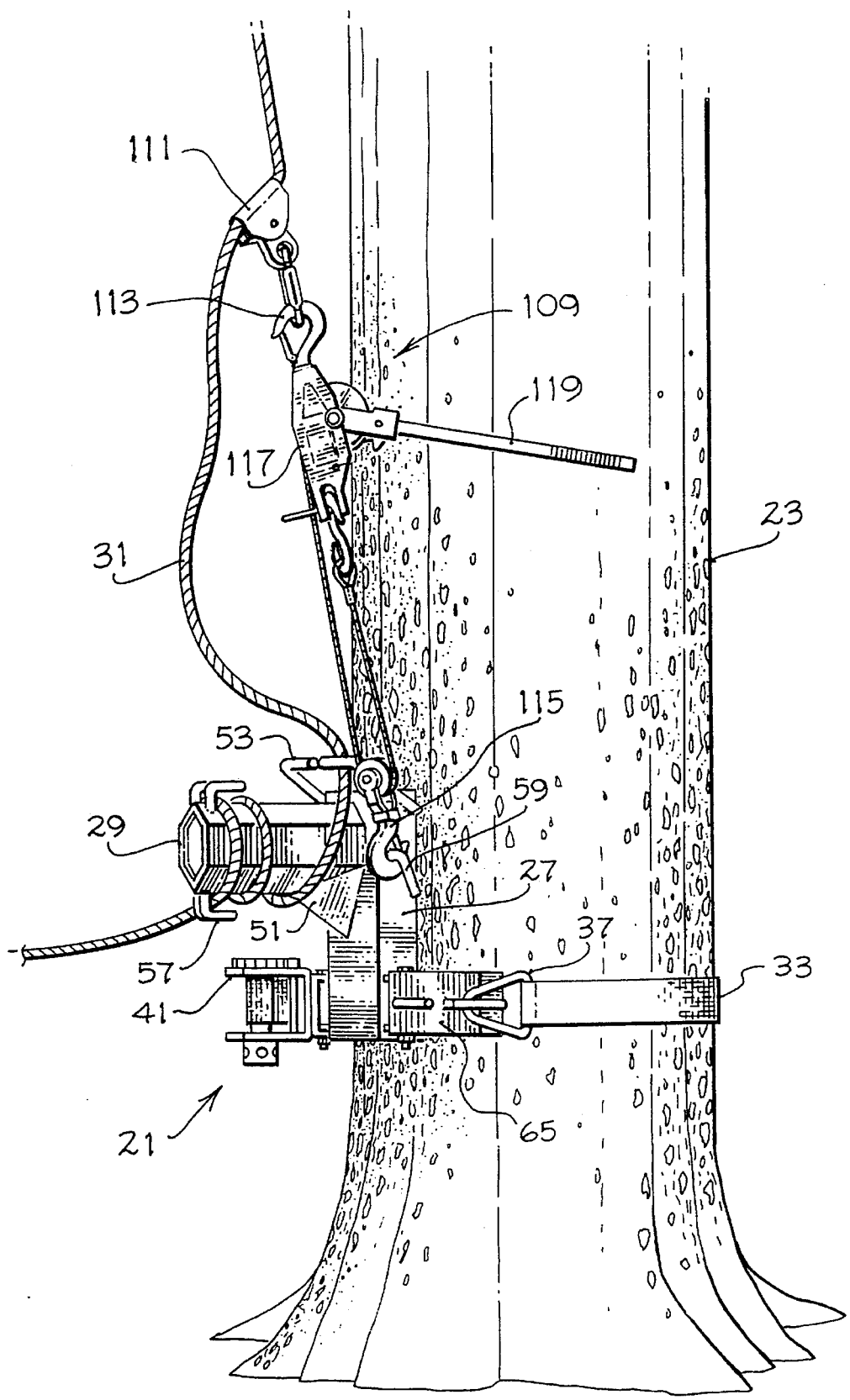
FIG_12

CONFORMED FRAME APPARATUS FOR HANDLING LOADS INVOLVED IN ARBOR RIGGING PROCEDURES

BACKGROUND OF THE INVENTION

The present invention relates to a frame apparatus of the kind which is constructed to be mounted on the trunk of a tree for use by arborists in handling loads involved in arbor rigging procedures.

The present invention relates particularly to a frame apparatus of this kind which conforms to the curvature of the trunk of the tree and engages the trunk at three triangularly disposed locations.

The triangular, three point engagement of the frame apparatus with the trunk provides a very stable mounting of the frame apparatus on the trunk.

The U.S. Pat. No. 4,239,188 issued Dec. 16, 1980 to Hobbs and entitled "Tree Handling Device" and the U.S. Pat. No. 4,314,693 issued Feb. 9, 1982 to Hobbs and entitled "Device for Arborist Contractors" disclose tree handling devices used by arborists for handling heavy tree limbs cut from a tree during arbor rigging procedures. Each of these patents is incorporated by reference in this application.

The device shown in U.S. Pat. No. 4,239,188 requires that a notch be cut across a portion of the circumference of the tree or that pins be inserted into the tree for secure engagement of the tree handling device with the tree.

The device shown in U.S. Pat. No. 4,314,693 does not require prior notching or slashing of the tree trunk, but the frame of the U.S. Pat. No. 4,314,693 patent device engages the trunk with just two horizontally extending flange members, an upper flange member and a lower flange member. Both flange members have straight edge surfaces without any curvature. The straight edges of these two flange surfaces engage the trunk in small strips of contact. The entire frame is therefore mounted on the trunk with just a small upper strip of contact and a small lower strip of contact.

SUMMARY OF THE INVENTION

It is a primary object of the present invention to construct a frame apparatus which engages a curved surface of a trunk of a tree at three triangularly disposed locations to provide a very stable mounting of the frame apparatus on the trunk.

It is a related object to conform a lower, horizontally extending, frame structure to the circumferential curvature of the trunk so that the lower frame structure engages the trunk at the outer ends of the lower frame structure.

It is another object of the present invention to engage the outer ends of the lower frame structure with the trunk without the need to cut into the existing curvature of the tree trunk.

In all embodiments of the present invention a frame apparatus, of the kind mounted on the trunk of a tree for use by arborists in handling loads involved in an arbor rigging procedure, includes frame means for engaging the curved surface of the trunk at three triangularly disposed locations.

The frame means include a lower, horizontally extending, frame structure which is conformed to the curvature of the trunk for engaging the trunk at the outer ends of the lower frame structure, thereby providing horizontal, vertical and rotational stability to the frame apparatus.

The frame means include a vertical, upwardly extending, frame structure for engaging the trunk at a third location at the upper end of the vertical frame structure.

The lower frame structure has a configuration which enables the outer ends of the lower frame structure to engage the trunk without the need to cut into the existing curvature of the tree trunk.

A load beam mounted on the frame means extends outwardly for receiving turns of a load rope in frictional engagement.

Attachment means are operatively associated with the lower frame structure for pulling the end portions of the lower frame structure into secure engagement with the trunk.

In a specific embodiment of the invention the attachment means include a strap. One end of the strap has a ring which connects to a hook at one end of the lower frame structure. A windup reel is mounted at the other end of the lower frame structure and winds the other end of the strap around a rotatable reel to pull the ends of the lower frame structure into engagement with the trunk.

Angled spike means are positioned at the same end of the lower frame structure which mounts the windup reel in one embodiment of the invention. The angled spike means are inclined at an angle which is opposed to the direction of movement of the strap toward the lower frame structure during tightening of the strap. The angle utilizes the circumferential shifting of the frame apparatus on the trunk and the tightening of the strap to embed the spike means into the trunk and to secure the frame apparatus to the tree.

In one embodiment of the present invention the lower, horizontally extending frame structure has a fixed, concavely configured inner surface which is shaped to enable the lower frame structure to engage the trunk only at the outer ends of the lower frame structure.

In another embodiment of the present invention the lower, horizontally extending frame structure has a three part, articulated structure. This articulated structure comprises the lower end of the vertical structure and two outer wing members which are hinge connected to the lower end of the vertical frame structure. The outer wing members pivot about the hinge means so that the lower frame structure conforms readily in a circumferential direction to trunks of varied diameters and curved surfaces. The lower frame structure remains rigid to forces in the vertical direction.

In one embodiment of the present invention pad means are located at each of the three triangularly disposed locations (at which the frame apparatus engages the trunk) for resiliently gripping the opposed portion of the trunk in a way which minimizes damage to the tree.

In this embodiment the frame apparatus includes upper spike means and a hinge connection of the upper spike means to the upper end of the vertical frame member. The upper spike means can be positioned inwardly to engage the trunk (for utilizing forces on the upper end of the frame apparatus on the trunk to secure the upper end of the vertical frame structure to the trunk), or the upper spike means can be positioned outwardly so that the spike means do not engage the trunk during an arbor rigging procedure.

Also in this embodiment, the frame apparatus includes a lower spike means and a hinge connection of the lower spike means at an outer end of the lower frame structure. The lower spike means can be positioned inwardly at an angle to engage the trunk. The angle utilizes circumferential shifting and inward pulling of the frame apparatus on the trunk to embed the spike means in the trunk. The spike means can be positioned outwardly so that the spike means do not engage the trunk during an arbor rigging procedure.

In one embodiment of the invention the load beam includes a rope guide surface located on the lower, inner end of the load beam. The rope guide surface is inclined at an angle which causes turns of rope on the load beam to be positioned outwardly on the load beam. This minimizes possible overlap of turns of rope in the event of any slack in the load rope.

In one embodiment of the invention the load beam is a fixed, non-rotatable load beam used as a rope friction brake.

In another embodiment of the present invention the load beam is a rotatable beam which includes a winch for rotating the load beam to permit lifting of loads.

In most of the embodiments of the invention rope entry and restraint guides are mounted on the frame apparatus for guiding a load rope substantially directly to either side of the load beam.

In certain embodiments of the invention (in which the load beam is a fixed, non-rotating beam) nose end restraints are mounted on the outer nose of the load beams for leading a load rope off the nose end of the fixed beam.

In all embodiments of the invention attachment means are mounted on the frame apparatus in an approximate line of entry of the load rope. The attachment means function as a cleat. The cleat can be used for tying off and can also be used as an attachment cleat for a come along or pulley system. The come along or pulley system can be used for removing excess slack out of the load rope and can also be used for lifting.

In some embodiments of the invention a cooling liquid is contained within the load beam. The cooling liquid cools the load beam and reduces the heat input into the turns of rope engaged in frictional sliding contact with the load beam. This minimizes the risk of heat damage to a load rope as turns of the load rope slip about the load beam during a load lowering arbor rigging procedure.

Methods and apparatus which incorporate the features described above and which are effective to function as described above constitute further, specific objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is an isometric view showing a frame apparatus constructed in accordance with one embodiment of the present invention and mounted on the trunk of a tree.

In FIG. 1 the lower portion of the trunk of the tree disposed below the frame apparatus has been broken away to illustrate the way in which the frame apparatus of the present invention conforms to the curvature of the surface of the trunk of the tree and permits the lower part of the frame structure to engage the curved surface of the trunk at the outer ends of the lower frame structure.

FIG. 2 is an isometric view of the back side of the frame apparatus shown in FIG. 1.

FIG. 3 is a side elevation view, in cross section, through the load beam of the frame apparatus shown in FIGS. 1 and 2. FIG. 3 shows how the interior of the load beam provides a reservoir for a cooling fluid to reduce heating of a rope. The cooling fluid absorbs frictional heat which can be produced as wraps of a load rope (shown in phantom outline in FIG. 3) are permitted to slip around the outside of the load beam during a load lowering arbor rigging operation. The fluid also transfers the heat into the structure of the frame apparatus.

FIG. 4 is a top plan view of the frame apparatus shown in FIG. 1. FIG. 4 shows the frame apparatus positioned on the trunk of the tree but without the attachment strap fully tightened.

FIG. 5 is a view like FIG. 4 but showing the attachment strap tightened so as to cause an angled spike structure at one end portion of the lower frame structure to penetrate the trunk. The angle utilizes a circumferential shifting and inward pulling of the frame apparatus on the trunk (a motion which occurs during a strap tightening operation) to cause the angled spike structure to penetrate the trunk. The penetration produces a secure attachment of the frame apparatus to the trunk when the strap attachment is tightened.

FIGS. 4 and 5 also show how the frame apparatus is positioned to engage the trunk at an upper end of the vertically extending frame structure. This upper location of engagement is securely produced when a load is applied to the load beam by a load rope during an arbor rigging procedure.

FIG. 6 is an isometric view (like FIG. 1) but showing a second embodiment of a frame apparatus constructed in accordance with the present invention.

The embodiment shown in FIG. 6 has a lower frame structure in which end portions of the lower frame structure are connected by hinge connections to a lower end portion of the vertically extending frame structure. The rotatable end portions rotate about the hinges and enable the frame apparatus to be conformable to trunks of varied diameters and surface curvatures.

FIG. 7 is a pictorial view showing another perspective of the frame apparatus of FIG. 6 mounted on a trunk of a tree.

FIG. 8 is an isometric view of the back side of another embodiment of a frame apparatus constructed in accordance with the present invention. The embodiment shown in FIG. 8 incorporates a hinged lower frame structure like the FIG. 6 embodiment. The FIG. 8 embodiment includes a resilient pad at each of three triangularly disposed locations of engagement with the trunk. The pads resiliently grip the trunk in a way which minimizes damage to the tree.

FIG. 9 is a fragmentary plan view showing how one end portion of the lower frame structure shown in FIGS. 6–8 rotates about the hinge (with its rotatable and stowable spike in the engaged position).

FIGS. 10 and 11 are top plan views of the embodiment of the frame apparatus shown in FIG. 8.

FIG. 10 shows the frame apparatus on the trunk of the tree with the swingout spike engaged just before the strap is tightened.

FIG. 11 is a view like FIG. 10 but showing the attachment strap tightened so as to cause an angled spike structure at one end portion of the lower frame structure to penetrate the trunk. The angle utilizes a circumferential shifting and inward pulling of the frame apparatus on the trunk (a motion which occurs during a strap tightening operation) to cause the angled spike structure to penetrate the trunk. The penetration produces a secure attachment of the frame apparatus to the trunk when the strap attachment is tightened.

FIG. 12 is a view like FIG. 7 but showing how a come along pulley system is used with the frame apparatus either for removing excess slack out of the load rope or for lifting with the load rope.

DETAILED DESCRIPTION OF THE PREFERRED EMBODIMENTS

A frame apparatus constructed in accordance with one embodiment of the present invention is indicated generally by the reference numeral 21 in all figures (except FIG. 9).

The frame apparatus 21 is constructed to be mounted on the trunk 23 of a tree for use by arborists in handling loads involved in an arbor rigging procedure.

In FIG. 1, the lower portion of the trunk 23 (disposed below the frame apparatus) has been broken away to better illustrate the way in which the frame apparatus conforms to the curvature of the trunk.

As illustrated in FIG. 1, the frame apparatus 21 includes a lower, horizontally extending, frame structure 25 for engaging the trunk at the outer ends of the lower frame structure (as will be described in more detail below).

The frame apparatus 21 includes a vertically, upwardly extending, frame structure 27.

The upper end of the vertical frame structure 27 engages the trunk at a third location so that the frame apparatus engages the curved surface of the trunk 23 at three triangularly disposed locations (as will also be described in greater detail below).

The frame apparatus 21 includes a load beam 29 which extends outwardly from the vertical frame structure 27. The load beam 29 receives turns of a rope 31 in frictional engagement to handle loads incurred during an arbor rigging procedure.

In the embodiment shown in FIG. 1, the load beam is a fixed, non-rotatable load beam and is used as a rope friction brake.

A strap 33 encircles the trunk 23 (as best shown in FIGS. 7 and 12) and is used to attach the frame apparatus 21 to the trunk 23.

One end 63 of the lower frame structure 25 has a welded-on hook 35.

A triangularly-shaped ring 37 at one end of the strap 33 slips over and into the hook 35 to connect that end of the strap to the frame apparatus.

The other end of the strap 33 is connected to a reel 39 which is mounted for a rotation within a bracket 41. The bracket 41 is mounted on an end portion 65 of the lower frame structure 25.

The reel 39 is rotated by a bar 43.

A ratchet 45 (see FIG. 2) prevents the reel 39 from unwinding as the strap 33 is tightened.

The lower frame structure 25 has a second hook 47. The ring 37 hooks into the second hook 47 to hold the strap 33 in place in a stowed position when the frame apparatus 21 is being transported between job sites.

The load beam 29 shown in FIGS. 1–5 is mounted on the vertical frame structure 27 by a weld bead 49. In other embodiments the load beam may be bolted to the vertical frame structure. The fixed, non-rotatable load beam 29 functions as a rope friction brake, as will be described in more detail below.

The load beam 29 shown in FIGS. 1–5 is a cylindrical beam having a circular cross-section except for the lower, inner end of the beam. The underside of the inner end of the beam includes a shaped surface 51. In FIGS. 1–5 the surface 51 is formed integrally with the load beam. The shaped surface could however, be a separate additional member, such as, for example, a separate inclined bar or tube. The shape of the surface 51 causes turns of the rope 31 on the load beam to be positioned outwardly on the central and outer portions of the load beam, rather than permitting such turns of rope to remain coiled about the inner end portion of the load beam 29. This surface 51 minimizes possible overlap of turns of the rope during any slack in the load rope, as will be described in more detail below with particular reference to the direction arrow 52 shown in FIG. 6.

The frame apparatus 21 has rope entry guides 53 mounted on each side of the upper end of the vertical frame structure 27 for guiding a load rope 31 substantially directly to either side of the fixed load beam 29. The guides 53 also function as restraint guides if the approach entry of the rope is not directly above the guide hooks. The restraint function is particularly important in the event of a slack condition in the rope, as will be discussed in more detail below with respect to FIG. 6.

As illustrated in FIG. 1, the rope is guided and restrained by the rope entry guide 53 on the right hand side (as viewed in FIG. 1) of the load beam 29.

The rope could be guided and restrained to the other side of the load beam 29 by using the other rope entry guide 53 (not visible in FIG. 1).

An upper nose end rope restraint 55 is attached to the outer, nose end of the load beam 29, and a lower nose end rope restraint 57 is attached to the lower side of the nose end of the load beam 29. See FIGS. 1 and 2.

As illustrated in FIG. 2, the top nose end rope restraint 55 is preferably a continuous, generally U-shaped member.

The upper and lower nose end rope restraints 55 and 57 permit leading a load rope off the nose end of the fixed beam and in either direction without losing wraps.

The U-shaped upper restraint 55 also serves as a handle for carrying the frame apparatus 21.

In FIG. 1, the load rope 31 is led off the lower end of the nose and to the leftward (as viewed in FIG. 1) side of the nose. The load rope may be led off either the top or bottom end rope restraint.

A rope attachment element or cleat 59 is mounted on each side of the vertical frame structure 27 at about the level of the load beam 29. The rope attachment element 59 serves as a cleat both for tying off a load rope 31 during an arbor rigging procedure and for using the element 59 as a means of attachment for a come along or pulley system during an arbor rigging procedure.

The come along or pulley system can be used for removing excess slack out of the load rope 31 or for lifting and will be described in more detail below with reference to FIG. 12.

The rope attachment element 59 is mounted on the frame apparatus in an approximate line of entry of the load rope and is positioned to be out of the way of the turns of the load rope about the load beam 29.

It should be noted that while a fixed load beam 29 is illustrated in both the FIG. 1 and FIG. 6 embodiments, the load beam 29 can also be a conventional, rotatable beam which extends outwardly from the frame means. Conventional winch means can be mounted on the frame apparatus for turning the rotatable beam to permit the lifting of loads by a rope wrapped around the rotatable beam or to permit the removal of rope slack. Such a rotatable beam and winch structure is shown in U.S. Pat. Nos. 4,239,188 and 4,314,693 which are incorporated by reference in this application as noted above.

The details of construction of the lower, horizontally extending frame structure 25 and the vertical, upwardly extending frame structure 27 are best illustrated in FIG. 2.

As illustrated in FIG. 2, the vertical frame structure 27 is a single, hollow box section having uniform length, height and width dimensions through out except for the top end plate. The top end plate has an edge portion 61 which projects inwardly from the inner edges of the side walls. The inner edge surface of the edge portion 61 makes the engagement with the tree trunk 23 when a load is applied in an upward direction to the load beam 29 by the rope 31, thereby adding substantial resistance to vertical motion of the frame apparatus 21.

The axis of the load beam 29 is approximately perpendicular to the vertical frame structure 27. The edge portion 61 extends inwardly so that the load beam 29 will be, on the average, positioned approximately horizontally when a load is applied to the load beam. The load on the load beam pulls the inner edge of surface 61 into secure engagement with the trunk 23. Having load beam 29 in a strictly horizontal position is not critical to the operation of frame apparatus 21 due to the functions of the surface 51 and the upper and lower nose end rope guides 55 and 57, as discussed above.

The lower, horizontally extending, frame structure 25 includes the lower end portion of the vertical frame member 27 and also comprises two outer end or wing portions 63 and 65.

In the embodiment shown in FIGS. 1–5, each of the outer end portions 63 and 65 is welded to the vertical frame member 27.

The parts 63 and 65 are welded at fixed, inwardly extending angles (as viewed in FIG. 2). The angles enable the lower, horizontally extending frame structure 25 to have a fixed, concavely configured inner surface. The contour enables the lower frame structure to engage the trunk 23 at the two end portions of the lower frame structure. See FIGS. 1, 4, and 5.

The end portion 63 is a hollow box structure, as best illustrated in FIG. 2.

The outer end of the end portion 65 is formed with a plurality of angled spikes 67.

It should be noted that while three spikes 67 are shown in FIG. 2, in some applications only two spikes 67, located preferably at the corners of the end portion 67, may be preferred.

The spikes 67 are formed at an angle which is opposed to the direction of travel of the strap 33 (see FIGS. 4 and 5) toward the reel 39 (as the reel is wound up to tighten the strap 33). This angle of the spikes 67 utilizes the circumferential shifting of the frame apparatus 21, occurring during the tightening of the frame apparatus to the trunk 33, to secure the frame apparatus 21 to the tree. Thus, as best illustrated in FIG. 4, when the frame apparatus 21 is positioned on the trunk 23 without the strap 33 being fully tightened (see FIG. 4), the spikes 67 contact the trunk 23 at an angle as illustrated.

When the strap 33 is further tightened, as illustrated in FIG. 5, the frame apparatus 21 tends to shift circumferentially on the trunk 23 (in the direction indicated by the direction arrow 69 in FIG. 5).

The tightening of the strap 33 also pulls the end 65 inwardly (as indicated by the direction arrow 70 in FIG. 5).

The resultant movement of the end 65 is in the direction indicated by the direction arrow 72 in FIG. 5. This is the angle of inclination of the spikes 67.

The angle of the spikes 67 utilizes the circumferential and inward shifting of the frame apparatus 21 as a result of the tightening of the belt to cause the spikes to penetrate the trunk (as illustrated in FIG. 5).

This secures the frame apparatus 21 to the trunk 23 and produces secure engagement of the outer end portions of the lower frame structure 25 with the trunk 23.

Because the lower frame structure 25 has an internal configuration which is conformed to the curvature of the trunk 23, there is no need to cut into the existing curvature of the tree trunk in order to securely attach the frame apparatus to the trunk at the two lower locations. It is not necessary to cut a notch in the trunk or to insert pins into the trunk (as was required for the use of the device of the U.S. Pat. No. 4,239,188).

The two lower locations provide the lower base for the triangular engagement of the frame apparatus 21 with the trunk 27. The upper edge portion 61 is positioned against the trunk 23 as the spikes 67 are embedded in the trunk 23, and this edge portion 61 is then pulled into secure engagement with the trunk 23 as the load is applied to the load beam 29 during an arbor rigging operation, as described above.

The triangular, three-point contact of the frame apparatus 21 with the trunk 23 provides a very stable mounting of the frame apparatus 21 on the trunk 27.

The frame apparatus 21 may be fabricated entirely of steel, or some portions of the frame apparatus such as, for example, the load beam may be fabricated of aluminum.

Steel has benefits of lower cost and less complex weld procedures, but aluminum is lighter and has better heat transfer characteristics.

It is necessary to avoid overheating the rope 31. Excessive heat can quickly damage synthetic rope. Excessive heat can be produced by friction during sliding engagement of the turns of rope on the load beam 29 when the operator lowers heavy loads.

Fabricating the load beam 29 of aluminum, rather than steel, provides less concentration of frictional heat in the turns of rope; but there may still be undesirable restrictions on the speed at which a load can be lowered (when using the load beam 29 as a rope friction brake), even when the load beam 29 is fabricated from aluminum.

In one embodiment of the present invention, as illustrated in FIGS. 2 and 3, the load beam 29 is formed with a hollow, enclosed interior 72 so that the interior 72 can provide a reservoir for cooling fluid.

As illustrated in FIGS. 2 and 3, the front plate of the vertical frame structure 27 is formed with an opening 73, and a removable plug 75 is fitted within the opening 73 to permit the hollow interior of the load beam 23 to be filled with a cooling fluid.

The upper, inner part of the vertical frame member 73 is formed with a horizontally extending chamber 77 which serves as an expansion chamber, and the chamber 77 is connected to the reservoir chamber 72 by an opening 79.

As heat is absorbed from the load beam 29 into the cooling fluid, the expansion of the heated cooling fluid causes the cooling fluid to flow through the orifice 79 (in the direction indicated by the block arrow in FIG. 3) and into the expansion chamber 77.

The heat produced by the frictional contact of the moving coils of the rope 31 on the outside of the load beam 29 is conducted through the load beam 29 and into the cooling fluid rather than being permitted to build up in the moving coils of the rope 31. The cooling fluid transfers heat into the main frame structure.

FIG. 6 is an isometric view (like FIG. 1) but showing a second embodiment of a frame apparatus 21 constructed in accordance with the present invention.

The embodiment showing FIG. 6 has a lower frame structure in which the end portions 63 and 65 are connected by hinged connections 81 and 83 to the lower end of the vertical extending frame structure 27. The hinged connections permit the end portions 63 and 65 to rotate about the hinges and enable the lower frame apparatus to be conformable to trunks of varied diameters and surface curvatures.

The embodiment shown in FIG. 6 also incorporates a fixed load beam 29 which has a hexagonal cross-section for the outer section rather than the circular cross-section as shown in FIG. 1 embodiment. The underside of the inner end of the beam is formed with an angled throat surface 51. The hexagonal cross-section configuration can be helpful in reducing frictional heat buildup in the load rope 31. The load beam 29 can also be fabricated from plate stock rather than having to be fabricated by an extrusion process or casting process or a machine process. The ridge type surfaces also produce higher friction than a smoothly curved surface without the ridge type surfaces.

FIG. 8 is an isometric view of the back side of another embodiment of a frame apparatus constructed in accordance with the present invention. The embodiment shown in FIG. 8 incorporates a hinged lower frame structure like the FIG. 6 embodiment.

The embodiment shown in FIGS. 8–11 also includes resilient pads 87, 89 and 91 (see FIG. 8) at each of the three triangularly disposed locations at which the frame apparatus engages the trunk. These resilient pads minimize damage to live trees during non tree removal arbor rigging procedures. The pads are particularly useful for minimizing any damage to the cambium layer of the tree.

The pads 87, 89 and 91 are made of rubber or of other suitable compressable material and are mounted and contained within respective receptacles 93, 95, and 97 formed integrally on the frame apparatus 21. The pads are retained in place by carriage bolts which are recessed within the pads, as best illustrated in FIG. 8.

In a preferred embodiment of the frame apparatus 21 shown in FIGS. 8–11, hinged spike structures are included at the top end of the vertical frame member 27 and at the outer end of the rotatable wing section 65 of the lower frame structure 25.

The details of these two spike structures will now be described with particular reference to FIGS. 8, 10 and 11.

As illustrated in FIG. 8, a spike structure 99 having spike elements 67 is mounted by a hinge connection 101 to the outer end of the wing 65.

The spike structure 99 may be rotated so that the spike elements 67 do not engage the trunk. This is the position shown in phantom in FIG. 8. This position of the spike elements is preferred for operations on a live tree when rigging would be necessary, but the tree itself is not to be removed.

The spike structures 99 may be rotated inwardly (to the position shown in continuous outline in FIG. 8 and in FIGS. 10 and 11).

In this disposition of the spike structure 99 the spike elements 67 are effective to function in the same way as described for the spike elements 67 in the embodiment shown in FIGS. 1, 2, 4, and 5.

When the spike structure 99 is rotated inwardly to the position shown in FIG. 11, and when the strap 33 is tightened to produce the inwardly directed force 70 and the circumferentially directed force 69, the resultant force (acting in the direction of the arrow 72 in FIG. 11) causes the spike elements 67 to penetrate the trunk 23 and to secure the frame apparatus to the trunk 23.

The spike elements 67 shown in the FIG. 11 embodiment function in the same way as the spike elements 67 shown in the FIG. 5 embodiment.

The angled spikes utilize the circumferential shifting and inwardly pulling of the frame apparatus 21 on the trunk, occurring during the attachment of the frame apparatus to the trunk of the tree, to secure the frame apparatus to the tree.

As best illustrated in FIG. 8, the spike apparatus at the top of the vertical frame structure 27 comprises a blade 103 mounted for rotation by a hinge 107 on the top of the vertical frame structure 27. The blade 103 has at least one spike element 105.

When the blade 103 is rotated to position shown in continuous outline in FIG. 8, the spike element 105 does not make any contact with the trunk of the tree.

When the blade 103 is rotated to the position shown in phantom in FIG. 8, the spike element 105 penetrates the trunk of the tree to provide a more positive engagement of the frame apparatus with the trunk of the tree at that upper location.

As noted above, the angled throat surface 51 (see FIG. 6) causes turns of the rope 31 on the load beam 29 to be positioned outwardly on the load beam for minimizing possible overlap of turns of rope initiated by a slack in the load rope 31.

The slack may occur after a section of the tree has been cut and free falls before a force is applied to the section by the load rope 31. The resultant slack occurs above the frame apparatus 21 and in the first coil of rope on the load beam.

This slack condition is illustrated by the coils shown in phantom outline in FIG. 6. When the load snaps back on, some crossing and overlap of coils of the rope can occur, if the coils are not properly positioned in non-overlapping relationship.

As the load resumes and the slack is taken out of the rope, the combination of the rope entry and restraint guide 53 and the angled surface 51 shown in FIG. 6 causes the rope to be properly shifted outwardly (as indicated by the direction arrow 52 in FIG. 6). This eliminates or minimizes the chance for crossover and lockup of the coils of rope on the load beam 29.

It is a feature of the frame apparatus of the present invention that the frame apparatus with the fixed load beam can be used not only as a rope friction brake for controlled lowering of loads but can also be used (in combination with appropriate auxiliary apparatus) for lifting loads.

This feature of the present invention is illustrated in FIG. 12.

In FIG. 12, a come along, indicated generally by the reference number 109, is connected between the load rope 31 and the attachment cleat 59. The come along 109 can then produce a downward pull on the load rope to lift a load.

The rope 31 is gripped by clamp 111, a hook 113 is connected by a shackle to the clamp 111, and a hook 115 is engaged with the cleat 59 of the frame apparatus 21.

A ratcheting cable and pulley apparatus 117 can then be actuated by a handle 119 to pull downwardly on the rope 31. This produces slack in the rope below the clamp 111 (as illustrated in FIG. 12) and exerts a downward pull on the portion of the rope above the clamp. The upwardly extending portion of the rope 31 loops over a pulley (not shown in FIG. 12) of this application but corresponding to the pulley number 33 of FIGS. 5 and 6 of the U.S. Pat. No. 4,329,188 incorporates by reference in this application to lift a tree section or to remove rope slack.

The come along 109 shown in FIG. 12 is a standard tool of arborists. The secure mounting of the frame apparatus 21 on the trunk 23 enables the attachment cleat 59 to be used with the come along 109 for lifting loads, even though the load beam 29 is a fixed, nonrotating, rope friction brake.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A frame apparatus which is constructed to be mounted on and conformed to the trunk of a tree for use by arborists in handling loads involved in an arbor rigging procedure, said frame apparatus comprising, frame means for engaging a curved surface of the trunk of a tree at three triangularly disposed locations, said frame means including a lower, horizontally extending, frame structure conformed to the curvature of the trunk for engaging the trunk at first and second locations at first and second end portions of the lower frame structure, said frame means including a vertical, upwardly extending, frame structure having an upper end for engaging the trunk at a third location at the upper end of the vertical frame structure, said lower frame structure having a configuration, when mounted on the trunk, which is sufficiently conformed to the curvature of a tree trunk so as to enable said lower frame structure to engage the trunk at said first and second locations and without the need to cut into the existing curvature of the tree trunk, load beam means mounted on the frame means and extending outwardly from an outer side of the frame means for receiving turns of rope in frictional engagement to handle loads incurred during an arbor rigging procedure, attachment means operatively associated with the lower frame structure for pulling the end portions of the lower frame structure into secure engagement with the trunk at the first and second lower locations and for positioning the upper end of the vertical frame structure for a secure engagement with the trunk at the third upper location when a load is applied to the load beam means during an arbor rigging procedure, said attachment means including a strap, hook means for connecting a first end of the strap to the lower frame structure at a first end portion of the lower frame structure, reel means at the second end portion of the lower frame structure for winding a second end of the strap around a rotatable reel to pull the end portions of the lower frame structure into secure engagement with the trunk at the first and second locations, and angled spike means at the second end portion of the lower frame structure for penetrating the trunk at an angle which is opposed to the direction of travel of the strap toward the frame means during wind-up of the strap around the rotatable reel so that the angled spike means utilize circumferential and inward shifting of the frame apparatus on the trunk, during the attachment of the frame apparatus to the trunk of a tree, to secure the frame apparatus to the tree.

2. The invention defined in claim 1 wherein the lower, horizontally extending frame structure has a fixed, concavely configured inner surface which is shaped to enable the lower frame structure to engage the trunk only at said first and second locations at end portions of the lower frame structure.

3. The invention defined in claim 1 wherein the lower, horizontally extending, frame structure has a three part articulated structure which comprises the lower end of the vertical frame structure and two outer wing members and including hinge means connecting the wing members to the vertical frame structure for permitting the outer wing members to pivot about the hinge means so that the lower frame structure conforms readily to trunks of varied diameters and curved surfaces.

4. The invention defined in claim 1 wherein the load beam means include a rope guide surface located on a lower, inner end of the load beam means and inclined at an angle which causes turns of rope on the load beam means to be positioned outwardly on the load beam means for minimizing possible overlap of turns of rope during a slack in the load carried by the rope.

5. The invention defined in claim 1 wherein the load beam means is a fixed, non-rotatable load beam used as a rope friction brake.

6. The invention defined in claim 5 wherein the fixed beam has a circular cross section.

7. The invention defined in claim 5 wherein the fixed beam has a ridged cross section.

8. The invention defined in claim 1 including rope entry guide and restraint means mounted on the frame means for guiding a load rope substantially directly to at least one side of the load beam.

9. The invention defined in claim 5 wherein the fixed beam has an outer, nose end and including nose end rope restraint means for leading a load rope off the nose end of the fixed beam.

10. The invention defined in claim 5 including attachment means mounted on the frame means in an approximate line of entry of a load rope.

11. The invention defined in claim 1 wherein the load beam means include a rotatable beam which extends outwardly from the frame means and including winch means for rotating the rotatable beam to permit lifting of loads by a rope wrapped about the rotatable beam and to permit the removal of rope slack and stretch.

12. The invention defined in claim 1 including cooling means within the load beam means for cooling the load beam means and for minimizing heat damage to a rope which could result from frictional heat build up as turns of the rope slip about the load beam means during a load lowering arbor rigging procedure.

13. The invention defined in claim 1 wherein the load beam means comprise a cylindrical beam member made of aluminum.

14. The invention defined in claim 1 wherein the load beam means comprise a cylindrical member made of steel.

15. A frame apparatus which is constructed to be mounted on and conformed to the trunk of a tree for use by arborists in handling loads involved in an arbor procedure, said frame apparatus comprising, frame means for engaging a curved surface of the trunk of a tree at three triangularly disposed locations, said frame means including a lower, horizontally extending, frame structure conformed to the curvature of the trunk for engaging the trunk at first and second locations at end portions of the lower frame structure, said frame means including a vertical, upwardly extending, frame structure having an upper end for engaging the trunk at a third location at the upper end of the vertical frame structure, said lower frame structure having a configuration, when mounted on the trunk, which is sufficiently conformed to the curvature of a tree trunk so as to enable said lower frame structure to engage the trunk at said first and second locations and without the need to cut into the existing curvature of the tree trunk, load beam means mounted on the frame means and extending outwardly from an outer side of the frame means for receiving turns of rope in frictional engagement to handle loads incurred during an arbor procedure, attachment means operatively associated with the lower frame structure for pulling the end portions of the lower frame structure into secure engagement with the trunk at the first and second lower locations and for positioning the upper end of the vertical frame structure for a secure engagement with the trunk at the third upper location when a load is applied to the load beam means during an arbor procedure, pad means at each of said three triangularly disposed locations for resiliently gripping the opposed portion of the trunk in a way which minimizes damage to the tree.

16. The invention defined in claim 15 wherein the vertical, upwardly extending, frame structure includes upper spike means and a hinge connection of the upper spike means to the upper end of the vertical frame structure for permitting the upper spike means selectively either to be positioned inwardly to engage the trunk to secure the upper end to the trunk or to be positioned outwardly so that the spike means do not engage the trunk during an arbor procedure.

17. The invention defined in claim 15 including lower spike means at one end portion of the lower frame structure and hinge means for permitting the spike means selectively either to be rotated to a position in which the spike means engage the trunk as the attachment means pull the lower frame structure into secure engagement with the trunk or to be rotated to a second, outer position in which the spike means do not engage the trunk during an arbor procedure.

18. A frame apparatus which is constructed to be mounted on and conformed to the trunk of a tree for use by arborists in handling loads involved in an arbor procedure, said frame apparatus comprising, frame means for engaging a curved surface of the trunk of a tree at three triangularly disposed locations, said frame means including a lower, horizontally extending, frame structure conformed to the curvature of the trunk for engaging the trunk at first and second locations at first and second end portions of the lower frame structure, said frame means including a vertical, upwardly extending, frame structure having an upper end for engaging the trunk at a third location at the upper end of the vertical frame structure, said lower frame structure having a configuration, when mounted on the trunk, which is sufficiently conformed to the curvature of a tree trunk so as to enable said lower frame structure to engage the trunk at said first and second locations and without the need to cut into the existing curvature of the tree trunk, load beam means mounted on the frame means and extending outwardly from an outer side of the frame means for receiving turns of rope in frictional engagement to handle loads incurred during an arbor rigging procedure, attachment means operatively associated with the lower frame structure for pulling the end portions of the lower frame structure into secure engagement with the trunk at the first and second lower locations and for positioning the upper end of the vertical frame structure for a secure engagement with the trunk at the third upper location when a load is applied to the load beam means during an arbor procedure, angled spike means at one end portion of the lower frame structure for penetrating the trunk at an angle which utilize circumferential shifting and inward pulling of the frame apparatus on the trunk, during the attachment of the frame apparatus to the trunk of a tree, to secure the frame apparatus to the tree.

* * * * *